US007823788B2

(12) United States Patent
Li et al.

(10) Patent No.: US 7,823,788 B2

(45) Date of Patent: Nov. 2, 2010

(54) ANTI-FAKE IDENTIFICATION DEVICE AND METHOD FOR MAKING THE SAME

(75) Inventors: Wei Li, Shenzhen (CN); Zhang-Geng Huang, Shenzhen (CN); Wan-Chun Zhao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 437 days.

(21) Appl. No.: 11/967,092

(22) Filed: Dec. 29, 2007

(65) Prior Publication Data

US 2009/0072040 A1 Mar. 19, 2009

(30) Foreign Application Priority Data

Sep. 19, 2007 (CN) ........................ 2007 1 0201763

(51) Int. Cl.
*G06K 7/10* (2006.01)

(52) U.S. Cl. ...................................................... 235/468

(58) Field of Classification Search ................. 235/439, 235/468, 494
See application file for complete search history.

(56) References Cited

U.S. PATENT DOCUMENTS

| | | | | |
|---|---|---|---|---|
| 3,829,662 | A * | 8/1974 | Furahashi | 235/468 |
| 6,328,209 | B1 * | 12/2001 | O'Boyle | 235/380 |
| 7,090,910 | B2 * | 8/2006 | Courtoy et al. | 428/158 |

* cited by examiner

*Primary Examiner*—Seung H Lee
(74) *Attorney, Agent, or Firm*—Jeffrey T. Knapp

(57) ABSTRACT

An anti-fake identification (14) includes a light-emitting layer (144) and a pattern layer (142). The light-emitting layer includes ultraviolet radiation photo initiator. The pattern layer has some through holes defined therein so as to form a pattern. Under ultraviolet radiation, the light-emitting layer emits light and the light passes through the pattern layer so as to show a pattern.

18 Claims, 4 Drawing Sheets

ANTI-FAKE IDENTIFICATION DEVICE AND METHOD FOR MAKING THE SAME

BACKGROUND OF THE INVENTION

1. Field of the Invention

The present invention relates to anti-fake identifications, particularly to an anti-fake identification device formed on a shell and a method for making the same.

2. Description of Related Art

In order to prevent counterfeiting, anti-fake identifications are generally attached to surfaces of the products or packages of the products by adhesive. However, this kind of anti-fake identifications can easily be removed and attached onto other products again. This will affect the benefit of product manufacturers.

In order to overcome the above disadvantage, one kind of anti-fake identification is directly formed on a package box. When the package box is opened, the anti-fake identification is destroyed at the same time. Thus, the anti-fake identification cannot be reused. However, the anti-fake identification is formed on the package box after packing the product, which is more difficult for making the anti-fake identification since the package box may big or heavy. In addition, the method of making the anti-fake identification includes steps of photo-chemical plate making, first polishing, printing, eroding process and second polishing. The process of making the anti-fake identification is complicated.

Therefore, a new anti-fake identification is desired in order to overcome the above-described problems.

SUMMARY OF THE INVENTION

In one embodiment thereof, an anti-fake identification includes a light-emitting layer and a pattern layer. The light-emitting layer includes ultraviolet radiation photo initiator. The pattern layer has through holes defined therein so as to form a pattern. Under ultraviolet radiation, the light-emitting layer emits light which passes through the pattern layer so as to show a pattern.

Other advantages and novel features will become more apparent from the following detailed description when taken in conjunction with the accompanying drawings.

BRIEF DESCRIPTION OF THE DRAWINGS

Many aspects of the anti-fake identification can be better understood with reference to the following drawings. The components in the drawings are not necessarily drawn to scale, the emphasis instead being placed upon clearly illustrating the principles of the present anti-fake identification. Moreover, in the drawings, like reference numerals designate corresponding parts throughout the several views. Wherein.

DETAILED DESCRIPTION OF THE INVENTION

The present anti-fake identification device can be applied to a shell of various products, such as mobile phones, hand-held game consoles and personal digital assistants and so on.

Figure 1:
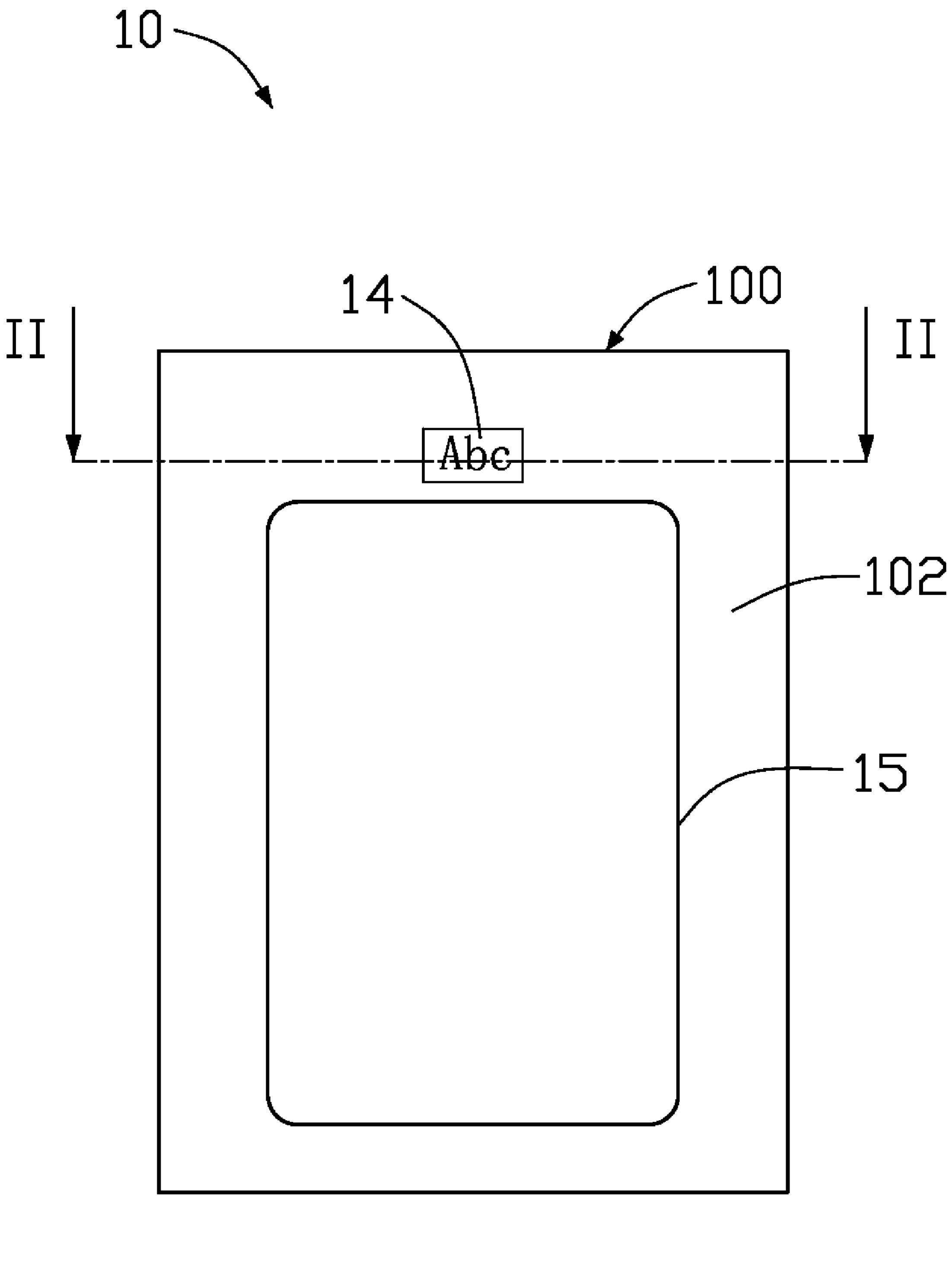
FIG. 1 is an isometric view of an anti-fake identification applied to a window of a portable electronic device, in accordance with a first embodiment of the present invention.
Figure 2:
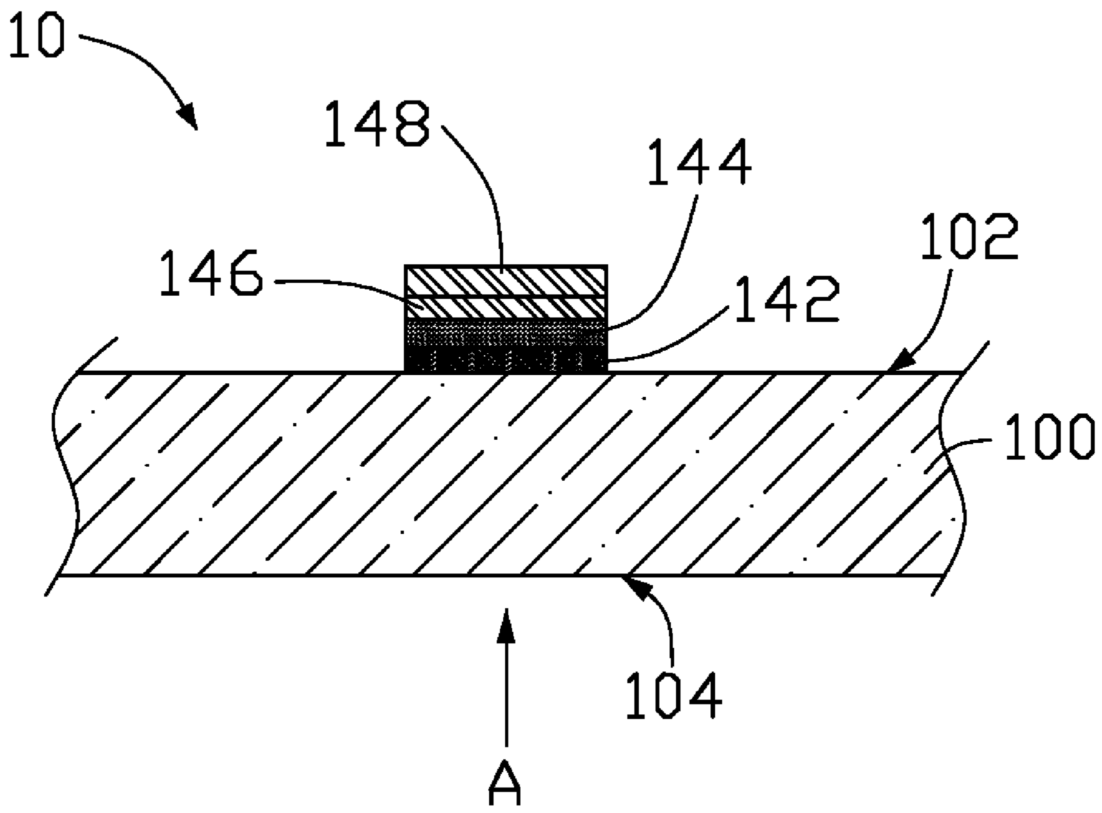
FIG. 2 is a partially cross-sectional view taken along line II-II of FIG. 1.

Referring to FIGS. 1 and 2, a window 10 used in a portable electronic device includes a substrate 100 and an anti-fake identification 14 formed on the substrate 100, in accordance with a first embodiment of the present invention. The substrate 100 is made of transparent material, e.g., polymethyl methacrylate. The substrate 100 has a first surface 102 and an opposite second surface 104. A rectangular frame-line 15 is formed on the first surface 102. The anti-fake identification 14 is rectangular and is positioned outside of the frame-line 15. The anti-fake identification 14 includes a pattern layer 142, a light-emitting layer 144, a first shielding layer 146 and a second shielding layer 148. The pattern layer 142 clings to the first surface 102 of the substrate 100. The light-emitting layer 144 is formed on the pattern layer 142. The first shielding layer 146 and the second shielding layer 148 are coated on the light-emitting layer 144 in the order written. The pattern layer 142 has through holes defined therein so as to form a pattern "Abc". The pattern layer 142 can be one of various colors.

The material (e.g., ink or resin) of the light-emitting layer 144 infiltrates into the through holes of the pattern layer 142. The light-emitting layer 144 has ultraviolet radiation photo initiator therein. Electrons of the ultraviolet radiation photo initiator can absorb energy of ultraviolet radiation, and transfer to high energy level state from ground energy level state. However, the electrons in high energy level state are not stable and can easily be transferred back to ground energy level state. When the electrons transfer to a ground energy level state from high energy level state, the released energy is shown as light. The light-emitting layer 144 is milk white in white light, but can be shown in other colors under ultraviolet radiation. The color of the light-emitting layer 144 in ultraviolet radiation is preferably different from that of the pattern layer 142. In this embodiment, the light-emitting layer 144 is green under ultraviolet radiation.

The first shielding layer 146 and the second shielding layer 148 can reflect lights. The first shielding layer 146 and the second shielding layer 148 are made of resin or printing ink. Under white light, if all of the pattern layer 142, the first shielding layer 146 and the second shielding layer 148 are white, the pattern "Abc" is not shown; if the pattern layer 142 is not white, a white pattern "Abc" can be seen through the pattern layer 142; if the pattern layer 142 is white and the first shielding layer 146 and the second shielding layer 148 are deep color, the pattern "Abc" is shown through the through holes of the pattern layer 142 in direction of the arrows shown in FIG. 2. In order to obscure the pattern "Abc" in white light, the pattern layer 142, the first shielding layer 146 and the second shielding layer 148 are preferably white.

In use, the window 10 is fixed on a shell (not shown) of an electronic device (not shown) including an LCD (liquid crystal display). The first surface 102 of the window 10 faces the LCD. The first shielding layer 146 and the second shielding layer 148 are configured for reflecting lights from the LCD. Observation of the anti-fake identification 14 can be made in a direction of the arrows shown in FIG. 2. Under white light, the pattern of the anti-fake identification 14 does not appear, instead only a white block is seen. Under ultraviolet radiation, the light-emitting layer 144 emits light and a green anti-fake identification 14 can be seen.

A method of making the window 10 includes steps as follow.

Firstly, a transparent substrate 100 is prepared. A frame-line 15 is formed on a first surface 102 of the substrate 100. The substrate 100 is then dried by a drying process.

Secondly, a white pattern layer 142 is formed on the first surface 102 of the substrate 100 outside of the frame-line 15. The pattern layer 142 may be formed by screen printing. Through holes are defined in the pattern layer 142 so as to form the pattern "Abc". The substrate 100 with the pattern layer 142 thereon is then dried by a drying process.

Thirdly, a light-emitting layer 144 is formed on the pattern layer 142. The light-emitting layer 144 is preferably made of printing ink. This printing ink is milk white under white light and includes ultraviolet initiating agent. Under ultraviolet radiation, electrons of the ultraviolet initiating agent absorb energy of the ultraviolet radiation and transmit to a higher energy level state. These electrons are unstable and easily return back to their ground energy level state. When the electrons return to their ground energy level state, energy is released as blue light. The substrate 100 with the pattern layer 142 and the light-emitting layer 144 thereon is then dried by a drying process.

A first shielding layer 146 is formed on the light-emitting layer 144. The first shielding layer 146 may be a printing layer. The substrate 100 with the pattern layer 142, the light-emitting layer 144 and the first shielding layer 146 thereon is then dried by a drying process.

A second shielding layer 148 is formed on the first shielding layer 146. The second shielding layer 148 may be a printing layer. The substrate 100 with the pattern layer 142, the light-emitting layer 144, the first shielding layer 146 and the second shielding layer 148 thereon is then dried by a drying process. It should be understood that the second shielding layer 148 can be omitted if the reflecting requirement is not so high.

Finally, the transparent substrate 100 with the pattern layer 142, the light-emitting layer 144, the first shielding layer 146 and the second shielding layer 148 thereon is laid on a platform of a numerical control machine (not shown). The transparent substrate 100 is then cut into a predetermined size of a window 10.

In the drying process described above, the substrate 100 may, advantageously, be under a temperature of 40-100° C. for 30-120 minutes, perfectly 60° C. for 30 minutes.

It is to be understood that hardener and thinner can be added into the above inks, so as to increase adhesiveness thereof.

It is to be further understood that the transparent substrate 100 may be cut into a predetermined size at first and then be printed the pattern layer 142, the light-emitting layer 144, the first shielding layer 146 and the second shielding layer 148. As such, the frame-line 15 can be omitted.

Figure 3:
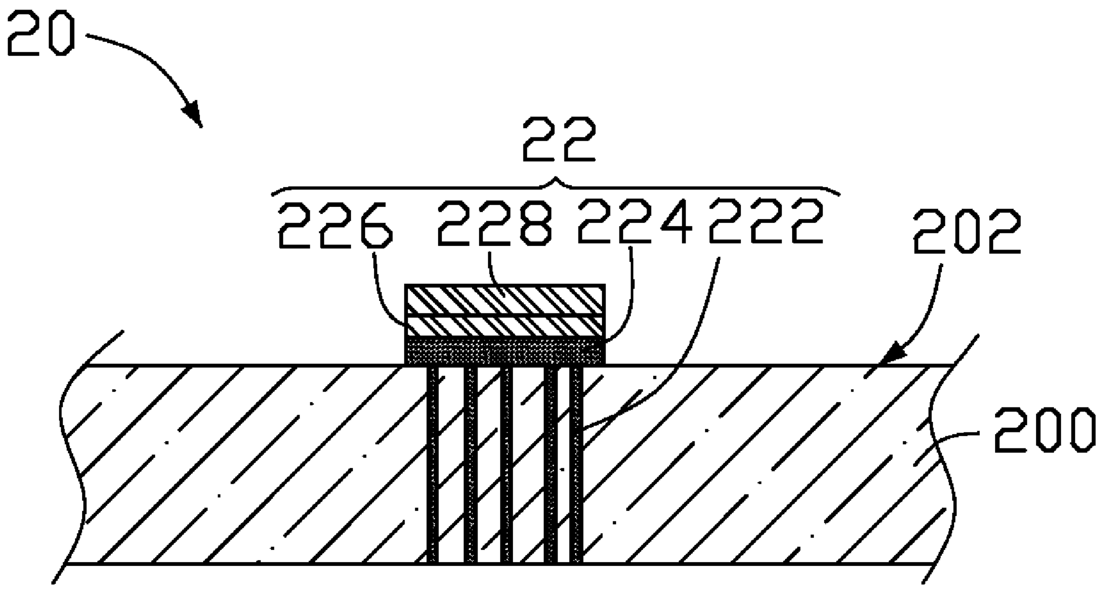
FIG. 3 is a partially cross-sectional view of an anti-fake identification applied to a window of a portable electronic device, in accordance with a second embodiment of the present invention.

Referring to FIG. 3, a window 20 according to a second embodiment of the present invention, includes an opaque substrate 200. The opaque substrate 200 has an upper surface and an anti-fake identification 22 formed on the upper surface 202. The anti-fake identification 22 includes a pattern layer 222, a light-emitting layer 224, a first shielding layer 226 and a second shielding layer 228. The opaque substrate 200 is partly hollow by carving or etching, so as to form the pattern.

Figure 4:
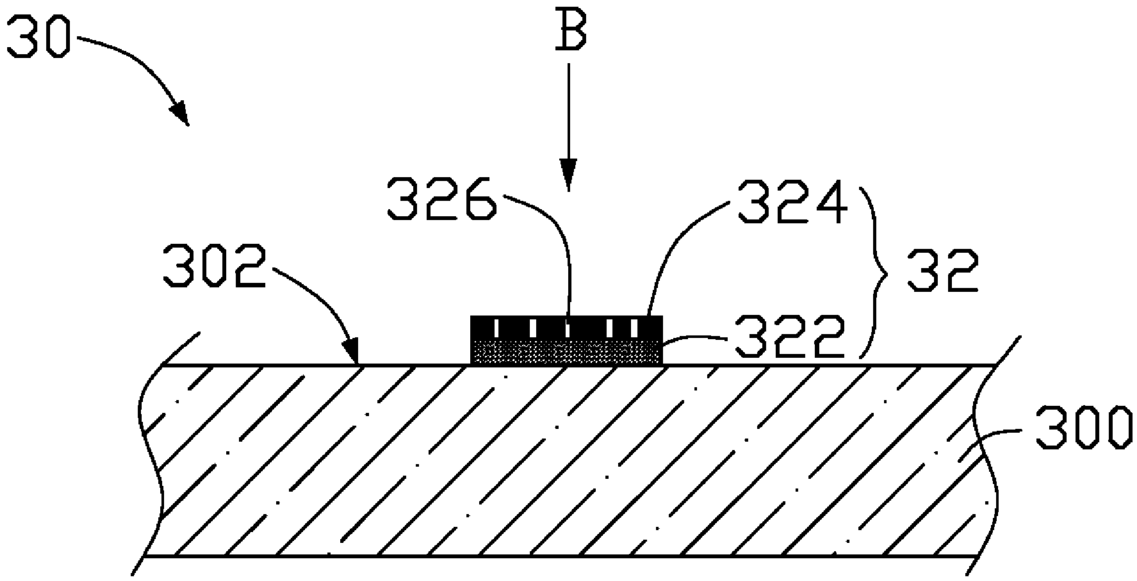
FIG. 4 is a partially cross-sectional view of an anti-fake identification applied to a shell of a portable electronic device, in accordance with a third embodiment of the present invention.

Referring to FIG. 4, a shell applied to a mobile phone (not shown) includes a substrate 300 and an anti-fake identification 32, in accordance with a third embodiment of the present invention. The substrate 300 may be made of acrylonitrile butadiene styrene. The substrate 300 has an outer surface, and the anti-fake identification 32 is formed on the outer surface. The anti-fake identification 32 includes a light-emitting layer 322 and a pattern layer 326. The light-emitting layer 322 clings to the outer surface of the substrate 300, and the pattern layer 326 is formed on the light-emitting layer 322. In this embodiment, the light-emitting layer 322 emits red light under ultraviolet radiation. The direction of observing the light-emitting layer 322 is along the arrow head "B". Under white light, a milk white anti-fake identification 32 is shown. Under ultraviolet radiation, the light-emitting layer 322 emits red light and the red light passes through the through holes of the pattern layer 142, so that a red anti-fake identification 32 is shown.

A method for making the anti-fake identification 32 includes steps as follow. Firstly, a substrate 300 is prepared. Secondly, a light-emitting layer 322 is formed on an outer surface of the substrate 300 by spray painting. The substrate 300 with the light-emitting layer 322 thereon is then dried by a drying process.

Thirdly, a pattern layer 326 is formed on the light-emitting layer 322 by spray painting. Through holes are defined in the pattern layer 326 so as to form a pattern. The substrate 300 with the light-emitting layer 322 and the pattern layer 326 thereon is then dried by a drying process.

Compared to the first embodiment of the present invention, in this embodiment, the light-emitting layer 322 is firstly formed and then the pattern layer 326 is formed on the light-emitting layer 322.

It is to be understood that the anti-fake identification 14, 22, 32 may be formed on the surface by drawing, or be integrally formed with the shell 30.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An anti-fake identification device comprising:

a light-emitting layer including ultraviolet radiation photo initiator;

a pattern layer, the pattern layer having some through holes defined therein thereby forming a pattern;

wherein, under ultraviolet radiation, the light-emitting layer emits light and the light passes through the pattern layer so as to show a pattern.

2. The anti-fake identification device as claimed in claim 1, wherein the light-emitting layer is made of ink.

3. The anti-fake identification device as claimed in claim 2, wherein the ink of the light-emitting layer infiltrates into the hollow portion of the pattern layer.

4. The anti-fake identification device as claimed in claim 1, further comprising a shielding layer formed on the light-emitting layer.

5. The anti-fake identification device as claimed in claim 1, wherein the pattern layer is opaque.

6. A shell comprising:

an outer surface;

an anti-fake identification formed on the outer surface including:

a light-emitting layer including ultraviolet radiation photo initiator;

a pattern layer, the pattern layer having some through holes defined therein so as to form a pattern, the light-emitting layer emitting light under ultraviolet radiation, and the light passing through the pattern layer so as to show a pattern.

7. The shell as claimed in claim 6, further comprising a window fixed thereon, wherein the anti-fake identification is formed on the window.

8. The shell as claimed in claim 7, wherein the window comprises a transparent substrate, and the pattern layer is formed on the transparent window.

9. The shell as claimed in claim 7, wherein the pattern layer is an opaque substrate of the window.

10. The shell as claimed in claim 6, further comprising a substrate, wherein the light-emitting layer is formed on the substrate, and the pattern layer is formed on the light-emitting layer.

11. A method of making an anti-fake identification comprising steps of:

preparing a substrate having a surface;

a pattern layer being formed on the surface of the substrate, the pattern layer having some through holes being defined in the pattern layer so as to form a pattern;

a light-emitting layer being formed on the substrate and clinging to the pattern layer, the light-emitting layer including ultraviolet radiation photo initiator, the light-emitting layer emitting light under ultraviolet radiation, and the light passing through the pattern layer so as to show a pattern.

12. The method as claimed in claim 11, further comprising a step of drying the substrate after the light-emitting layer being formed on the substrate.

13. The method as claimed in claim 12, further comprising a step of a first shielding layer being formed on the light-emitting layer after the substrate being dried by a drying process.

14. The method as claimed in claim 13, further comprising a step of drying the substrate after the first shielding layer being formed.

15. The method as claimed in claim 14, further comprising a step of a second shielding layer being formed on the first shielding layer.

16. The method as claimed in claim 15, wherein the pattern layer, the light-emitting layer, the first shielding layer and the second shielding layer are made of ink and are formed by printing.

17. The method as claimed in claim 11, wherein the pattern layer and the light-emitting layer are formed on the substrate by spray painting.

18. The method as claimed in claim 11, wherein the substrate is one part of a window.

* * * * *